United States Patent
Goupil et al.

(10) Patent No.: US 10,330,020 B2
(45) Date of Patent: Jun. 25, 2019

(54) TURBOJET WITH A DISCHARGE DUCT

(71) Applicant: SAFRAN AIRCRAFT ENGINES, Paris (FR)

(72) Inventors: Frederic Jacques Eugene Goupil, Moissy Cramayel (FR); Noel Joseph Camille Robin, Moissy Cramayel (FR); Regis Eugene Henri Servant, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 849 days.

(21) Appl. No.: 14/660,170

(22) Filed: Mar. 17, 2015

(65) Prior Publication Data

US 2015/0330308 A1 Nov. 19, 2015

(30) Foreign Application Priority Data

Mar. 17, 2014 (FR) .................................... 14 52197

(51) Int. Cl.
*F02C 9/18* (2006.01)
*F01D 25/24* (2006.01)
(Continued)

(52) U.S. Cl.
CPC ................ *F02C 9/18* (2013.01); *F01D 25/24* (2013.01); *F01D 25/243* (2013.01); *F02C 3/04* (2013.01); *F02K 3/075* (2013.01); *F16B 2/22* (2013.01); *F05D 2230/64* (2013.01); *F05D 2240/91* (2013.01); *F05D 2260/36* (2013.01);
(Continued)

(58) Field of Classification Search
None
See application file for complete search history.

(56) References Cited

U.S. PATENT DOCUMENTS 5,048,286 A * 9/1991 Stransky ................... F02C 9/18
                                                                137/15.1
7,818,957 B2 * 10/2010 Corsmeier ............ F01D 17/143
                                                                60/204

(Continued)

FOREIGN PATENT DOCUMENTS

EP  1 584 794 A1  10/2005
FR  2 961 251 A1  12/2011

(Continued)

OTHER PUBLICATIONS

French Preliminary Search Report and Written Opinion dated Nov. 14, 2014 in Application No. FR 1452197 filed Mar. 17, 2014 (with English Translation of Category of Cited Documents).

*Primary Examiner* — Kayla McCaffrey
(74) *Attorney, Agent, or Firm* — Oblon, McClelland, Maier & Neustadt, L.L.P.

(57) ABSTRACT

A unit including an intermediate turbojet casing formed by a hub including a downstream transverse endplate having formed therein at least one first opening putting the inside of the hub into communication with a duct extending downstream from the endplate and opening out at its downstream end via a second opening formed in an outer annular shroud extending downstream from the hub for defining the inside of an annular flow space for a secondary stream, is provided. The upstream end of the duct is fastened to the downstream endplate of the hub by releasable elastic engagement.

17 Claims, 4 Drawing Sheets

(51) Int. Cl.
  *F02C 3/04*   (2006.01)
  *F02K 3/075*  (2006.01)
  *F16B 2/22*   (2006.01)

(52) U.S. Cl.
  CPC ...... *F05D 2260/37* (2013.01); *F05D 2260/38* (2013.01); *Y02T 50/671* (2013.01)

(56) References Cited

U.S. PATENT DOCUMENTS

| | | |
|---|---|---|
| 2005/0271511 A1 | 12/2005 | Pasquiet |
| 2006/0242964 A1 | 11/2006 | Parker et al. |
| 2013/0008550 A1 | 1/2013 | Brault et al. |

FOREIGN PATENT DOCUMENTS

| | | |
|---|---|---|
| GB | 2 406 609 A | 4/2005 |
| WO | WO 2011/117560 A2 | 9/2011 |
| WO | WO 2013/163554 A1 | 10/2013 |

\* cited by examiner

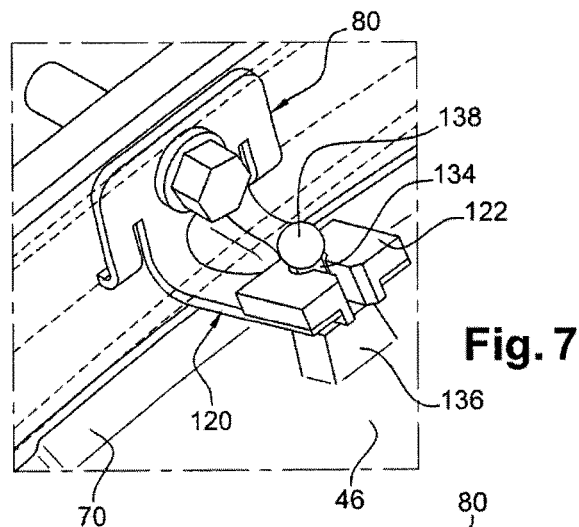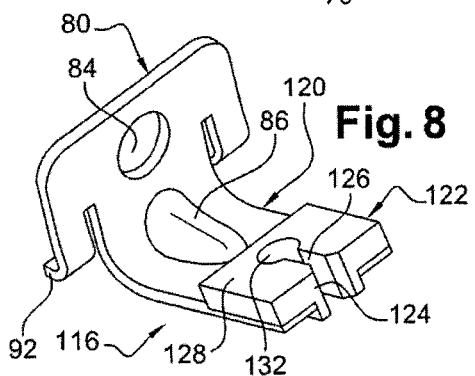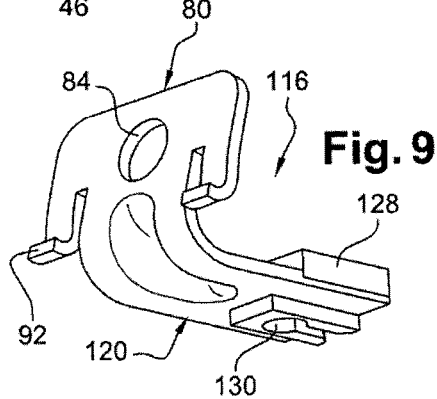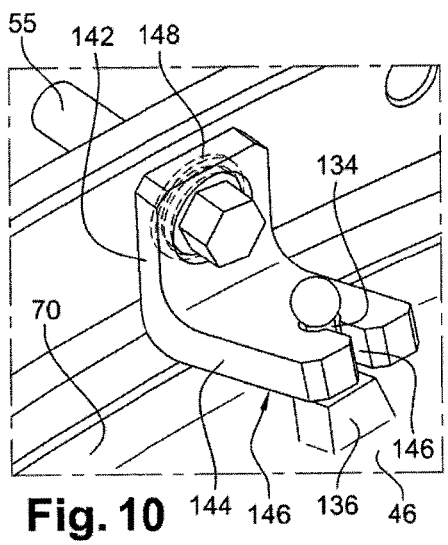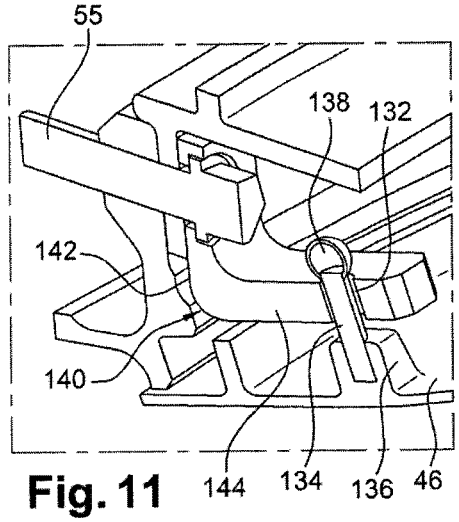

TURBOJET WITH A DISCHARGE DUCT

BACKGROUND OF THE INVENTION

Field of the Invention

The present invention relates to an aircraft turbojet, in particular of the bypass type.

In a two-body turbojet, the term "intermediate casing" is commonly used to designate a casing having its hub arranged between a low-pressure compressor casing and a high-pressure compressor casing.

The present invention relates more particularly to assembling together an air discharge duct associated with a discharge valve (of the type sometimes referred to as a variable bleed valve (VBV)) and a hub of intermediate casing in an aircraft turbojet.

Description of the Related Art

Conventionally, a bypass turbojet 10, as shown in FIG. 1 in a fragmentary diagrammatic axial section view, is constituted by a gas turbine 12 of axis 14 driving a ducted fan 16, which fan is generally located at the upstream end (UP) of the engine. The mass of air sucked in by the engine is split into a primary air stream (arrow A) that flows through the gas turbine or primary body, and a secondary air stream (arrow B) that comes from the fan 16 and that surrounds the primary body, the primary and secondary air streams being coaxial.

In well-known manner, the primary air stream (arrow A) is generally compressed by a first compressor 18, referred to as a low-pressure (LP) or booster compressor, having its LP shaft connected to the shaft of the fan 14 and driven in rotation by the shaft of a low-pressure turbine situated downstream (not shown), and then in a downstream (DN) compressor 20 referred to as a high-pressure (HP) compressor, having its HP shaft driven in rotation by the shaft of a high-pressure turbine arranged at the outlet from a combustion chamber and upstream from the low-pressure turbine (not shown).

In such a two-body turbojet, the term "intermediate casing" 22 is commonly used to designate a casing having its hub arranged between a casing 24 of the low-pressure compressor 18 and a casing 26 of the high-pressure compressor 20.

The intermediate casing 22 has a hub formed by an inner annular wall 28 defining the outside of the annular flow passage for the primary air stream between the low-pressure compressor 18 and the high-pressure compressor 20, and an outer annular wall 30 defining the inside of the annular flow passage 33 for the secondary air stream.

Furthermore, such a turbojet is generally fitted with devices known as discharge valves 32 or variable bleed valves (VBVs) that enable a portion of the primary air stream at the outlet from the LP compressor 18 to be sent into the annular channel 33 for the secondary air stream. By lowering the pressure downstream from the LP compressor 18, this discharge has the effect of lowering its operating point and of reducing the risk of the compressor 18, 20 surging, where surging constitutes a sudden reversal of the flow of the hot gas stream from the combustion chamber, which can damage the compressor 18, 20. Furthermore, in the event of accidental penetration of water, in particular in the form of rain or hail, or indeed in the event of accidental penetration of various kinds of debris that might harm the operation of the turbojet, these valves enable the water or the debris to be recovered and ejected from the primary stream feeding the combustion chamber with air.

Thus, discharge valves 32 are formed in the inner annular shroud 30 of the hub of the intermediate casing 22 and they communicate with a space lying between the inner annular shroud 28 and the outer shroud 30 of the intermediate casing 22.

In order to enable air to be discharged, the hub of the intermediate casing 22 has a downstream transverse endplate 34 arranged upstream from the high-pressure compressor 20 of the turbojet and connecting together the downstream ends of the inner and outer annular shrouds 28 and 30. The downstream endplate 34 has a plurality of first openings 36 arranged around the axis 14 of the turbojet 10, each communicating upstream with the inside of the hub and downstream with a respective duct 38 having its downstream end opening out via a second opening 40 in an outer annular shroud 42 that is formed extending the outer annular wall 30 of the intermediate casing 22 in a downstream direction.

As shown in FIG. 1, the hub of the intermediate casing 22 carries stator vanes 44 for guiding the flow of the secondary air stream coming from the upstream fan 16.

Usually, the discharge ducts 38 are fastened to the downstream endplate 34 of the valves of the intermediate casing 22 by bolting, and then the outer shroud 42 downstream from the intermediate casing 22 is mounted around the downstream ends of the ducts 38, which are likewise fastened by bolting to the inside face of the outer shroud 42.

In a turbojet of large diameter, the discharge ducts 38 are easy to assemble in that manner. Nevertheless, for engines of smaller diameter, the small amount of space downstream from the downstream endplate 34 does not enable the upstream ends of the discharge ducts 38 to be fastened in advance to the endplate 34 of the hub of the intermediate casing 22 by bolting. This limited amount of space is due mainly to the need to pass services, such as cables, in particular. Under such circumstances, it becomes necessary to assemble together the ducts 38 and the outer shroud 42 simultaneously, which is found to be complicated and lengthy to perform by a limited number of operators during a maintenance operation.

BRIEF SUMMARY OF THE INVENTION

A particular object of the present invention is to provide a solution that is simple, inexpensive, and effective to these problems, making it possible to avoid the above-specified drawbacks, at least in part.

To this end, the invention proposes a unit comprising an intermediate casing for a turbine engine including a hub provided with a downstream transverse endplate having formed therein at least one first opening putting the inside of the hub into communication with a duct extending downstream from the endplate and opening out at its downstream end via a second opening formed in an outer annular shroud extending downstream from the hub, said shroud being for defining the inside of an annular flow space for a secondary stream, the unit being characterized in that the upstream end of said duct is fastened to the downstream endplate of the hub by releasable elastic engagement.

According to the invention, fastening the upstream end of the discharge duct to the hub of the intermediate casing by a releasable elastic engagement connection enables the duct to be pre-mounted before mounting the outer annular shroud. Furthermore, because the duct is held in position by its upstream fastening to the hub of the intermediate casing, it is possible, during a maintenance operation, to reduce the time of the turbojet is taken out of service, thereby enabling certain other pieces of equipment of the turbojet to be installed and/or removed in limited time without removing the engine from the wing.

Furthermore, the proposed unit provides a connection of the discharge duct with the downstream endplate of the hub that is more flexible than in the prior art, correspondingly reducing the static stresses that are applied to the duct in operation.

According to another characteristic of the invention, the downstream end of the duct is fastened by releasable rigid assembly, e.g. by screw fastening, to the outer annular shroud.

The combination of assembling the discharge duct by elastic engagement at its upstream end and assembling it rigidly at its downstream end avoids having a statically indeterminate assembly of the duct between the hub and the shroud, thereby increasing its lifetime.

The term "rigid assembly" should be understood to herein as defining a connection that is achieved without elastic deformation assisting in assembling.

Preferably, the unit includes at least one first member secured to the downstream endplate and extending downstream therefrom, and at least one second member secured to the upstream end portion of the duct, the first member and the second member being arranged on the outside of the duct and co-operating together by releasable elastic engagement.

In a first embodiment of the invention, the first member has a plane, radial first portion fastened on a radial annular flange of the outer periphery of the downstream endplate by means of the fastener elements serving to secure the downstream ends of an annular row of radial vanes of the stator formed around the hub of the intermediate casing. It is thus possible to fasten the first member to the hub without adding a new independent fastener element that might make the turbojet more complicated to assemble.

The first member may include a second portion extending downstream from the first portion and including an elastically deformable portion co-operating by elastic deformation with the second member to provide the releasable elastic engagement.

In order to fasten the first member to the second member, the elastically deformable portion comprises a blade having a curved over portion and engaged by elastic deformation in an orifice in a radial lug of the duct forming the second member, in such a manner as to provide axial and radial retention of the second member on the first member.

The second member may also comprise a rod extending substantially radially from an outside surface of the duct and that is designed to be guided in upstream movement in an axial notch of the elastically deformable portion, the notch presenting a width that is determined in such a manner as to pinch the rod resiliently during the downstream movement of the duct.

According to yet another characteristic of the invention, the notch opens out at its upstream end in a tubular housing of diameter greater than the diameter of the cylindrical rod.

The elastically deformable portion may also be a fitting engaged from downstream on the free end of the second portion of the first member, the notch of said fitting co-operating with a corresponding notch in the free end of the second portion of the first member.

The first member may also be an elastically deformable one-piece part.

The elastically deformable portion may also be a spring clip co-operating with a rod extending substantially radially from an outer surface of the duct.

According to another characteristic of the invention, the assembly includes blocking means for preventing the first member turning on the downstream endplate so as to enable the first member to be held angularly on the endplate while being elastically engaged with the second member of the discharge duct.

Preferably, the radially outer end of the rod includes a projection, e.g. a spherical projection, shaped and dimensioned in such a manner as to provide an inward radial abutment for the second member against the first member.

In another embodiment of the invention, the first member is a rod extending substantially along the axis of the hub from the downstream face of the downstream endplate and co-operating by resilient engagement with an orifice in an elastically deformable part carried by a support tab extending from the outside of the duct.

Finally, the invention also provides a turbine engine, such as a bypass turbojet, including at least one unit of the above-described type.

BRIEF DESCRIPTION OF THE SEVERAL VIEWS OF THE DRAWINGS

The invention can be better understood and other details, advantages, and characteristics of the invention appear on reading the following description made by way of nonlimiting example and with reference to the accompanying drawings, in which:

FIGS. 7 to 9 are diagrammatic perspective views of a second embodiment of the invention;

FIGS. 10 and 11 are diagrammatic perspective views of a third embodiment of the invention;

DETAILED DESCRIPTION OF THE INVENTION

Figure 2:
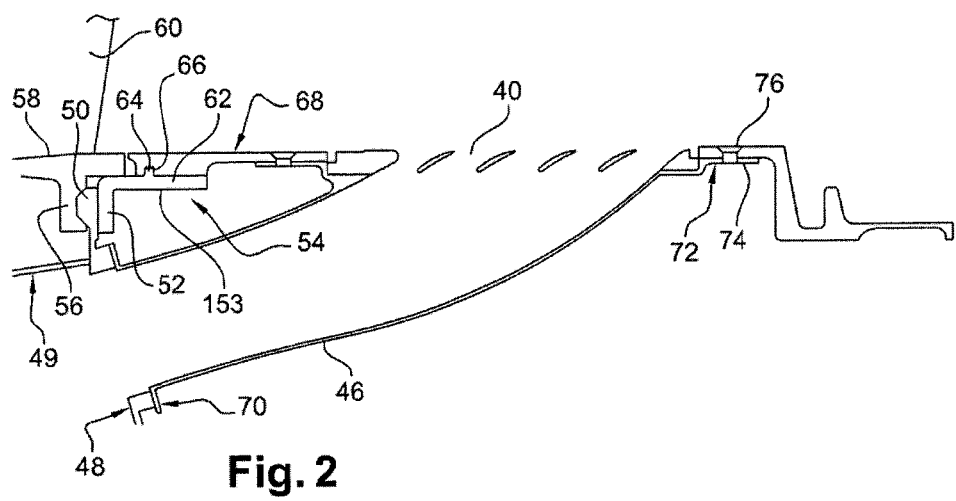
FIG. 2 is a diagrammatic view in axial section of a unit of the invention comprising a discharge duct assembled to a hub of an intermediate casing.

FIG. 2 shows more particularly a discharge duct 46 of the invention for fastening at its upstream end by releasable elastic engagement to a downstream endplate 48 of an intermediate casing hub 49. The releasable elastic engagement means are not shown in this figure, and several assembly variants are described with reference to FIGS. 3 to 16.

The downstream endplate 48 of the hub of the intermediate casing has an outer radial annular flange 50 interposed between an upstream radial annular rim 52 of an annular angle bar 54 and radial tabs 56 of stator outlet guide vanes (OGVs) surrounding the outside of the hub 49 of the intermediate casing. The radial tabs 56 of the stator vanes, the annular flange 50 of the downstream endplate 48, and the radial annular rim 52 of the angle bar 54 all have mutually aligned orifices for fastening these elements together by nut-and-bolt systems, the bolts 55 being visible in FIGS. 5, 6, 10, 11, and 12 that are described below, and the nuts being constituted for example by nuts that are riveted onto the upstream faces of the tabs 56 of the stator vanes so that it is the bolts that are turned and not the nuts in order to tighten the nut-and-bolt systems.

Alternatively, the hub formed integrally with the downstream endplate 48 may also be formed integrally with the annular angle bar 54. This unit may be obtained by casting, for example.

Each radial tab 56 of a stator vane extends radially inwards from a platform 58 that has an airfoil 60 extending radially outwards therefrom. The stator vanes are arranged circumferentially side-by-side so that the circumferential ends of the platforms 58 come into contact and together form an inner annular surface defining the inside of the flow passage for the secondary air stream.

The annular angle bar 54 has a cylindrical wall 62 that is connected at its upstream end to the annular rim 52 and that carries an external annular rib 64 that is received in an annular groove 66 of the annular shroud 68. The downstream ends of the circumferentially aligned platforms 58 are arranged in contact with the upstream end of the outer annular shroud 68 so as to ensure continuity of the walls defining the inside of the annular flow passage for the secondary air stream.

Figure 1:
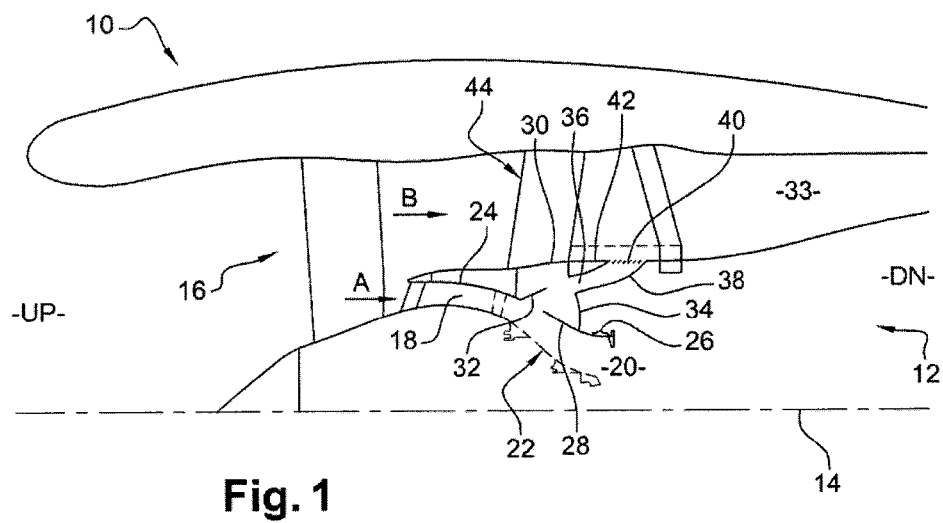
FIG. 1, described above, is a diagrammatic half-view in axial section of an aircraft turbojet of known type.

In practice, the outer annular shroud 68 is made up of a plurality of sectors arranged circumferentially end to end, with some of them including respective openings 40, as described with reference to FIG. 1, each communicating with the downstream end of a discharge duct 46.

At its upstream end, each discharge duct 46 has an annular collar 70 pressed against the perimeter of an orifice in the downstream endplate 48 in order to provide sealing. The downstream end of the duct 46 also has a peripheral rim 72 including tapped orifices 74 in alignment with corresponding orifices 76 in the annular shroud 68 for screw fastening purposes.

In the various embodiments of the invention described below, the upstream end of the duct 46 is fastened to the downstream endplate 48 by releasable elastic engagement that may take a variety of forms covered by the invention. In particular, in the embodiments shown, the engagement is achieved by means of two mutually independent members, one of which is secured to the downstream endplate 48 or to the discharge duct 46, and the other of which is secured to the discharge duct 46 order the downstream endplate 48. Naturally, the invention is not limited to the embodiments described and covers any type of elastic engagement between the downstream endplate 48 and a discharge duct 46.

Figures 3, 4:
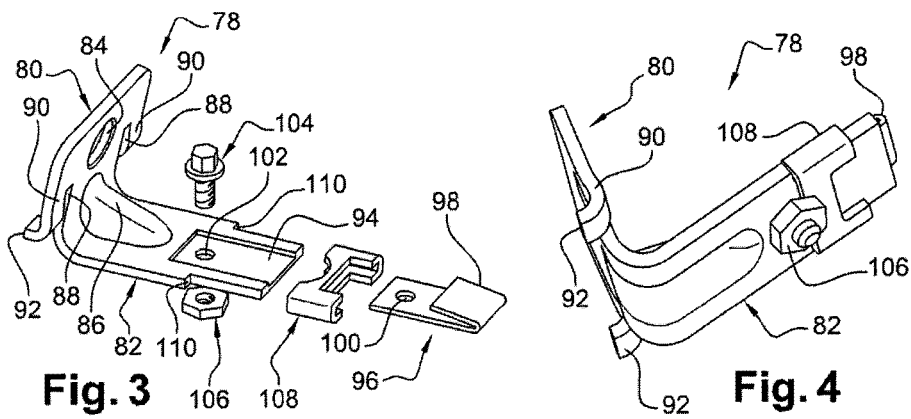
FIGS. 3 to 6 are diagrammatic perspective views of a first embodiment of the invention.

In a first embodiment of the invention described with reference to FIGS. 3 to 6, the first member 78 is generally L-shaped, being made up of a first portion 80 and of a second portion 82. The first portion 80 is formed by a wall extending transversely relative to the axis 14 (FIG. 1), being substantially plane and square in shape, having an orifice 84 that is situated approximately in the middle of the wall in order to pass a bolt for fastening to the annular rim 52 of the annular angle bar 54 (FIGS. 3 and 4). The bolt that is used is advantageously one of the bolts that are used for fastening a downstream tab 56 of a stator vane (OGV). The second portion 82 is generally rectangular in shape, defining a tongue that extends downstream. A swelling 86 is formed at the junction between the first portion 80 and the second portion 82 so as to have a curved shape that is convex towards the inside of the L-shape and concave towards the outside of the L-shape. This swelling 86 is designed to increase the mechanical strength of the first member 78 against deformation.

Figure 5:
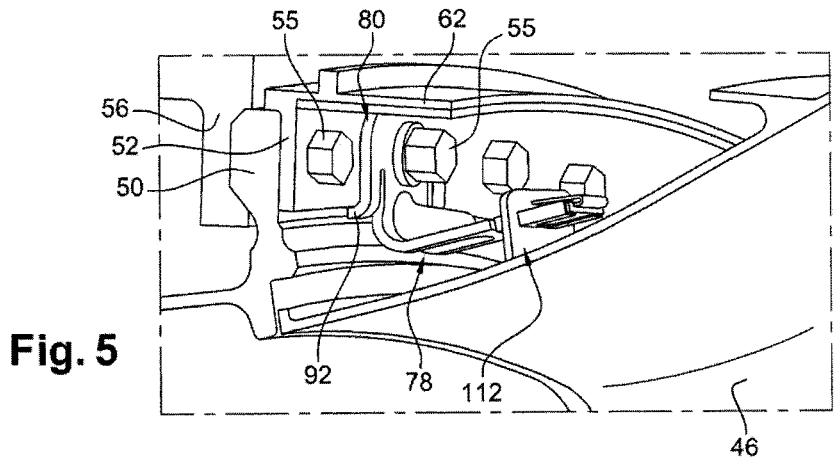
Figure 6:
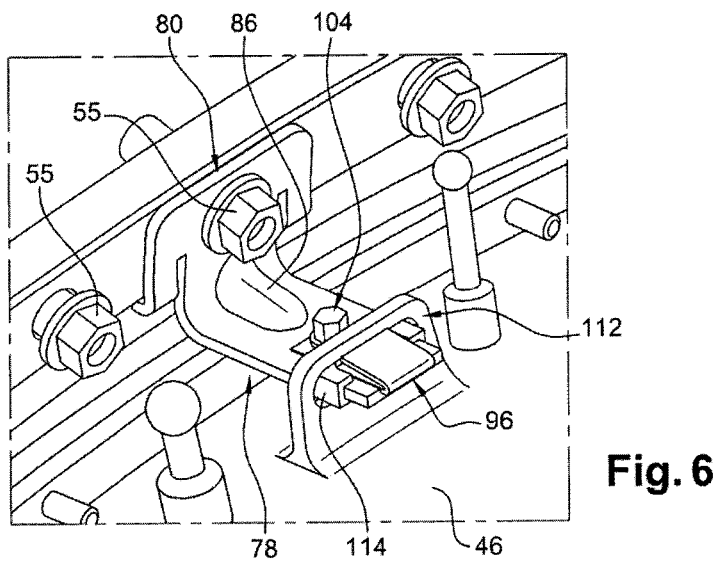

The first portion 80 also has two radial through slots 88 that are substantially parallel to each other and that open out into the radially inner end of the first portion 80. These slots define lateral tabs 90 having their radially inner ends 92 curved away from the second portion 82, i.e. upstream when the first member 78 is mounted on the hub 49 of the intermediate casing. As shown in FIGS. 5 and 6, the curved ends 92 to come into contact with the inner periphery of the annular rim 52 of the annular angle bar 54 so as to prevent the first member 78 from turning relative to the annular angle bar 54.

The downstream end portion of the second portion 82 of the first member 78 has a flat-bottom recess 94 in its outer face (facing the radially outwards from the axis 14), the recess having an outline that is substantially rectangular in general shape. A blade 96, e.g. made of metal material, is mounted in the recess in the second portion. At its end opposite from the first portion 80, this blade 96 has a portion 98 that is curved upstream so as to form an elastically deformable portion. The blade 96 as an orifice 100 in alignment with an orifice 102 formed in the recess in the second portion 82, and a bolt 104 is inserted in these orifices and receives a nut 106 at its free end. Thus, the blade 96 is held in place on the second portion 82 of the first member 78.

A part 108 is engaged by force around the second portion 82 and the portion of the blade that does not have the curved portion 98, and it is dimensioned in such a manner as to come into upstream abutment against two lateral faces 110 that are substantially parallel to the first portion 80. This part 108 is previously mounted around the second portion 82 before positioning the blade 96.

The first member 78 is to co-operate with a second member 112 that is constituted, in this first embodiment of the invention, by a radial lug formed on the outer face of the duct 46. This lug 112 has an orifice 114 of shape and size that are determined in such a manner as to enable the curved portion 98 of the blade 96 to be mounted by elastic engagement in the lug when the duct is moved downstream in its mounting position. After mounting, it can be understood that the curved portion 98 returns to its initial shape and its upstream end is thus arranged axially facing an edge of the lug 112 in such a manner as to hold the duct 46 axially to the downstream endplate 48.

The first member 78 is made of a material that deforms little, such as titanium. The part 108 is advantageously made of a non-metallic material, preferably out of an elastomer, so as to limit the effects of friction between the first member 78, which is made of metal, and the radial lug 112, which is also made of metal (e.g. titanium).

FIGS. 7 to 9 show a second embodiment of a unit assembled by engagement in which the first member 116 has a first portion 80 that is identical to the first portion 80 described with reference to the first member 78 described with reference to FIGS. 3 to 6.

Nevertheless, the second portion 120 is different and includes an axial and radial notch opening out at its downstream end. A block of elastically deformable material 122, e.g. made of elastomer, is engaged on the downstream end of the second portion 120 and has a middle portion 124 defining a notch 126 and connecting together a "top" portion 128 for pressing against the outer surface of the second portion 120 and a "bottom" portion 130 for pressing against the inner surface of the second portion 120. The shape and the dimensions of the middle portion 124 of the elastically deformable block 122 are determined in such a manner as to ensure that it is a tight fit in the notch of the second portion 120. Likewise, the spacing between the "top" portion 128 and the "bottom" portion 130 is designed so as to enable said portions to be a tight fit against the second portion 120 of the first member 116. Alternatively, the block of material may be secured to the second portion 120 by adhesive or by riveting. Assembly may also be achieved by the bottom and top portions 130 and 128 being moved apart so as to clamp onto the second portion 120.

The upstream end of the notch 126 in the block of material 122 opens out into a tubular housing 132 of axis that is substantially perpendicular to the second portion, which is plane in shape.

In this second embodiment, the second member 134 is a rod secured to the duct by being screwed into a projection 136 on the outer surface of the duct. The radially outer end of the rod 134 carries a spherical portion 138 of diameter that is greater than the diameter of the tubular housing 132 so that the spherical portion 138 comes into contact with the block of material 122 and thus holds the duct 46 radially relative to the endplate 48. When the discharge duct 46 is elastically engaged at its upstream end with the downstream endplate 48 and then fastened at its downstream end by being screwed to the annular shroud 68, the rod 134 becomes only lightly stressed by the elastically deformable block 122 since the rod is not clamped in the housing.

The width of the notch 126 is less than the diameter of the rod 134 so that the middle portion 124 of the block of material 122 presses against the rod 134 during the movement of the discharge duct 46 towards the downstream endplate 48.

In a third embodiment of the invention shown in FIGS. 10 and 11, the second member 134 is identical to that described with reference to FIGS. 7 to 9, and the first member 140 is a single piece of an elastically deformable material, e.g. made of elastomer. The generally L-shaped first member 140 likewise has a first portion 142 with an orifice for passing a bolt for fastening to the annular rim 52 of the angle bar 54 and a second portion 144 that is substantially perpendicular to the first portion 142 and that extends downstream from the radially inner end of the first portion 142. The notch 146 for clamping onto the rod 134 and the tubular housing 132 are made directly in the thickness of the second portion 144. Mounting is performed in identical manner to that described with reference to FIGS. 7 to 9.

In this embodiment, a metal washer 148 is incorporated in the first portion 142 around the orifice so as to serve as a bearing surface for the head of the bolt for fastening to the annular angle bar 54.

Figure 12:
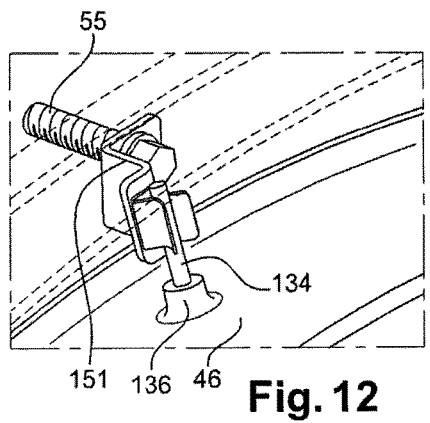
FIGS. 12 and 13 are diagrammatic perspective views of a fourth embodiment of the invention.
Figure 13:
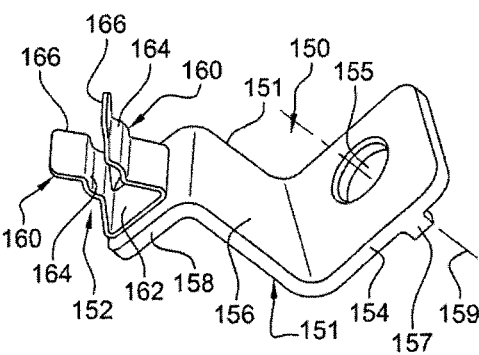

In a fourth embodiment of the invention as shown in FIGS. 12 and 13, the second member 134 is likewise identical to that described with reference to FIGS. 7 to 9, and only the first member 150 is different.

In this embodiment, the first member 150 has a support part 151 for supporting a spring clip 152 that is to receive the rod 134 of the duct 46 by elastic engagement. The support 151 has a radial first wall 154 with an orifice 155 for passing a bolt for fastening to the annular angle bar 54, which radial first wall is connected at a downstream end to a second wall 156 that extends downstream substantially perpendicularly to the first wall 154, and that is itself connected to a third wall 158 that extends in a direction circumferentially opposite to the direction of the first wall 154. On its face facing downstream, this third wall 158 carries the spring clip 152 made up of two arms 160 that project facing each other from the third wall 158 and that are connected together by a transverse wall 162 that is fastened to the third wall 162 of the support 150, e.g. by screw fastening. The arms 160 have two respective cylindrical portions 164 arranged relative to each other in such a manner that their concave faces face towards each other and together they define a tubular reception zone for the rod 134. The cylindrical portions 164 have parallel generator lines and they are connected at their ends remote from the transverse wall 162 two respective guide walls 166. The two guide walls 166 diverge away from each other on going away from the third wall 162 so as to form a guide zone for guiding the rod 134 as it moves between the two arms 164 of the spring clip 152.

The spring clip 152 may be made of high alloy steel, i.e. having at least one alloying element that exceeds 5% by weight. Other forms of spring clip could be used, without going beyond the ambit of the invention, providing they are suitable for elastic engagement with a second member.

In this embodiment, the first member 150 is prevented from turning relative to the angle bar 54 by the top edge 151 of the support 150 bearing against the radially inner face 153 of the cylindrical wall 62 of the angle bar 54 and also by a stub 157 extending axially upstream for the purpose of coming into contact with the inner periphery of the annular rim 52 of the annular angle bar 54 (FIGS. 2, 12, and 13). The stub is offset away from the second wall 156 relative to a plane containing the axis 159 of the orifice 155 and substantially parallel with the second wall 156. In this way, for an observer looking upstream, the stub 157 prevents the first member 150 from turning in the counterclockwise direction, and the top edge 151 prevents the first member 150 from turning in the clockwise direction. The clockwise direction may correspond to the direction for tightening the bolt 55 and the counterclockwise direction may correspond to loosening it.

In another possible embodiment of the invention, the first member 150 need not include a stub and it may be shaped in such a manner that the top edge prevents tightening of the bolt 55.

Although not shown, the radially outer end of the rod 134 may carry a spherical portion 138 as described with reference to FIGS. 7, 10, and 11.

Figure 14:
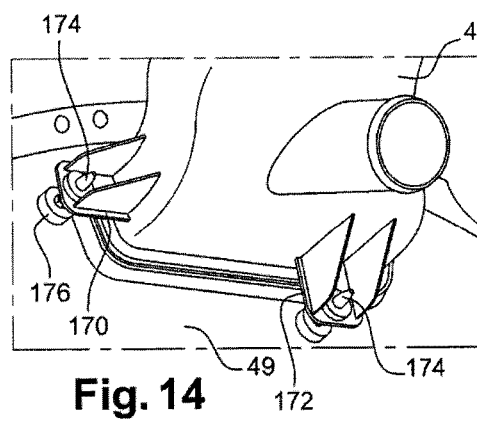
FIGS. 14 to 16 are diagrammatic perspective views of a fifth embodiment of the invention.
Figure 15:
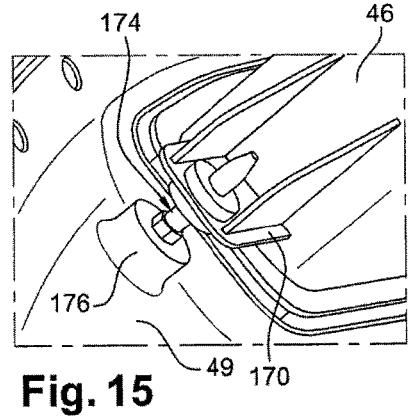
Figure 16:
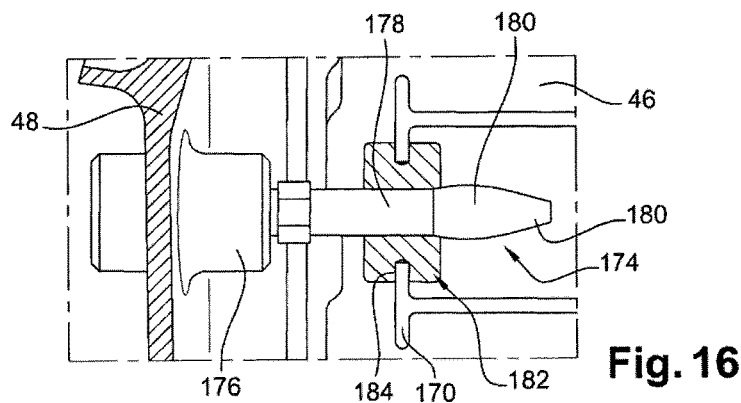

In a final embodiment of the invention as shown in FIGS. 14 to 16, the elastically deformable portion is carried by the second member 170 that is secured to the duct 46.

For this purpose, the upstream end of the duct 46 has at least one tab extending substantially radially from an outer surface of the duct. In the example shown, the duct has two tabs 170 and 172, one of them 170 extending circumferentially relative to the axis of the turbine engine, and the other extending radially inwards relative to the axis of the turbine engine. In this example, at the upstream end of the duct presents a section, in a plane perpendicular to the axis 14 of the turbine engine that is substantially rectangular in shape.

Below, the first and second fastener members 174 and 170 of the tab 170 are described, even though they are entirely identical for the tab 172.

In this example, the first member 174 is a rod having its upstream end screwed into a projection 176 on the downstream endplate 48. This first member 174 as a substantially cylindrical middle portion 178 and a portion forming a convex swelling 180 arranged immediately downstream from the middle portion 178 and terminating downstream at the free end of the rod 174 in a conical portion 180 of section that tapers going downstream.

The second member 170 carries an elastically deformable part 182, e.g. made of elastomer, and including an orifice for passing the rod 174. This elastically deformable part 182 is constituted by an elastically deformable ring having an outer peripheral annular groove 184 co-operating with the inside edge of the orifice in the tab 170. The elastic nature of the part 182 enables it to be forced fitted in the opening of the tab 170.

The duct 46 is thus mounted by bringing the orifices of each of the elastically deformable parts 182 into alignment with a respective rod 174 of the downstream endplate 48. Elastic engagement is then achieved by means of the convex portion 180 having a maximum outside diameter that is greater than the inside diameter of the orifice in the elastically deformable part 182. The duct 46 is engaged until the middle portion 178 of the rod 174 is received in the orifice of the elastically deformable part 182.

Thus, in the various embodiments of the invention, a discharge duct 46 is assembled with the endplate by elastic engagement on the downstream endplate 48, thereby enabling it to be assembled simply and quickly on the hub of the intermediate casing without being excessively stressed. During disassembly, the sectors of the annular shroud 68 are removed and the ducts are thus held radially by the upstream elastic engagement of each duct on the endplate 48, thereby simplifying maintenance operations and reducing the time the turbine engine is out of operation. It should be observed that the embodiments of FIGS. 3 to 13 present the advantage of not requiring any modification to the hub of the intermediate casing, which is a part that is obtained by casting and for which any change of shape would be very expensive.

In the embodiments shown in FIGS. 3 to 13, only one first member 78, 140, 150, and only one second member 112, 134 are shown and described. Nevertheless, it should be understood, that the duct may be fastened by means of more than one first member and one second member.

The invention claimed is:

1. A unit comprising:
   an intermediate casing for a turbine engine including a hub arranged between a low-pressure compressor casing and a high-pressure compressor casing and provided with a downstream transverse endplate having formed therein at least one first opening putting an inside of the hub into communication with a duct extending downstream from the downstream transverse endplate and opening out at a downstream end thereof via a second opening formed in an outer annular shroud disposed downstream from the hub, said shroud defining an inside of an annular flow space for a secondary stream,
   wherein an upstream end of said duct is fastened to the downstream transverse endplate of the hub by releasable elastic engagement.

2. The unit according to claim 1, wherein the downstream end of the duct is fastened by releasable rigid assembly to the outer annular shroud.

3. The unit according to claim 1, further comprising:
   a first member secured to the downstream transverse endplate and extending downstream therefrom, and
   a second member secured to the upstream end of the duct, the first member and the second member being disposed on an outside of the duct and co-operating together so as to fasten the upstream end of the duct to the downstream transverse endplate of the hub by releasable elastic engagement.

4. The unit according to claim 3, wherein the first member has a plane, radial first portion fastened on a radial annular flange of an outer periphery of the downstream transverse endplate by fastener elements serving to secure downstream ends of an annular row of radial vanes of a stator formed around the hub of the intermediate casing.

5. The unit according to claim 4, wherein the first member includes a second portion extending downstream from the first portion and including an elastically deformable portion co-operating by elastic deformation with the second member to provide the releasable elastic engagement.

6. The unit according to claim 5, wherein the elastically deformable portion comprises a blade having a curved over portion and engaged by elastic deformation in an orifice in a radial lug of the duct forming the second member in order to provide axial and radial retention of the second member on the first member.

7. The unit according to claim 5, wherein the second member comprises a rod extending substantially radially from an outside surface of the duct and designed to be guided in upstream movement in an axial notch of the elastically deformable portion, the notch presenting a width that is determined in such a manner as to pinch the rod resiliently during downstream movement of the duct.

8. The unit according to claim 7, an upstream end of the notch opens out in a tubular housing of diameter greater than a diameter of the rod.

9. The unit according to claim 7, wherein the elastically deformable portion is a fitting engaged from downstream on a free end of the second portion of the first member, the notch co-operating with a corresponding notch in the free end of the second portion of the first member.

10. The unit according to claim 7, wherein the first member is an elastically deformable one-piece part.

11. The unit according to claim 5, wherein the elastically deformable portion is a spring clip co-operating with a rod extending substantially radially from an outer surface of the duct.

12. The unit according to claim 7, wherein a radially outer end of the rod carries a projection shaped and dimensioned in such a manner as to provide an inward radial abutment for the second member against the first member.

13. The unit according to claim 4, further comprising blocking means for preventing the first member from turning on the downstream transverse endplate.

14. The unit according to claim 3, wherein the first member is a rod extending substantially along an axis of the hub from a downstream face of the downstream transverse endplate and co-operating by resilient engagement with an orifice in an elastically deformable part carried by a support tab extending from the outside of the duct.

15. A turbine engine comprising at least one unit according to claim 1.

16. The unit according to claim 2, wherein the downstream end of the duct is fastened by screw fastening to the outer annular shroud.

17. The unit according to claim 12, wherein the projection is a spherical projection.

* * * * *